F. DANKS.
PROCESS OF TREATING GARBAGE AND PRODUCTION OF CARBONIC ACID GAS THEREFROM.
APPLICATION FILED APR. 1, 1918.
1,319,515.
Patented Oct. 21, 1919.
2 SHEETS—SHEET 1.
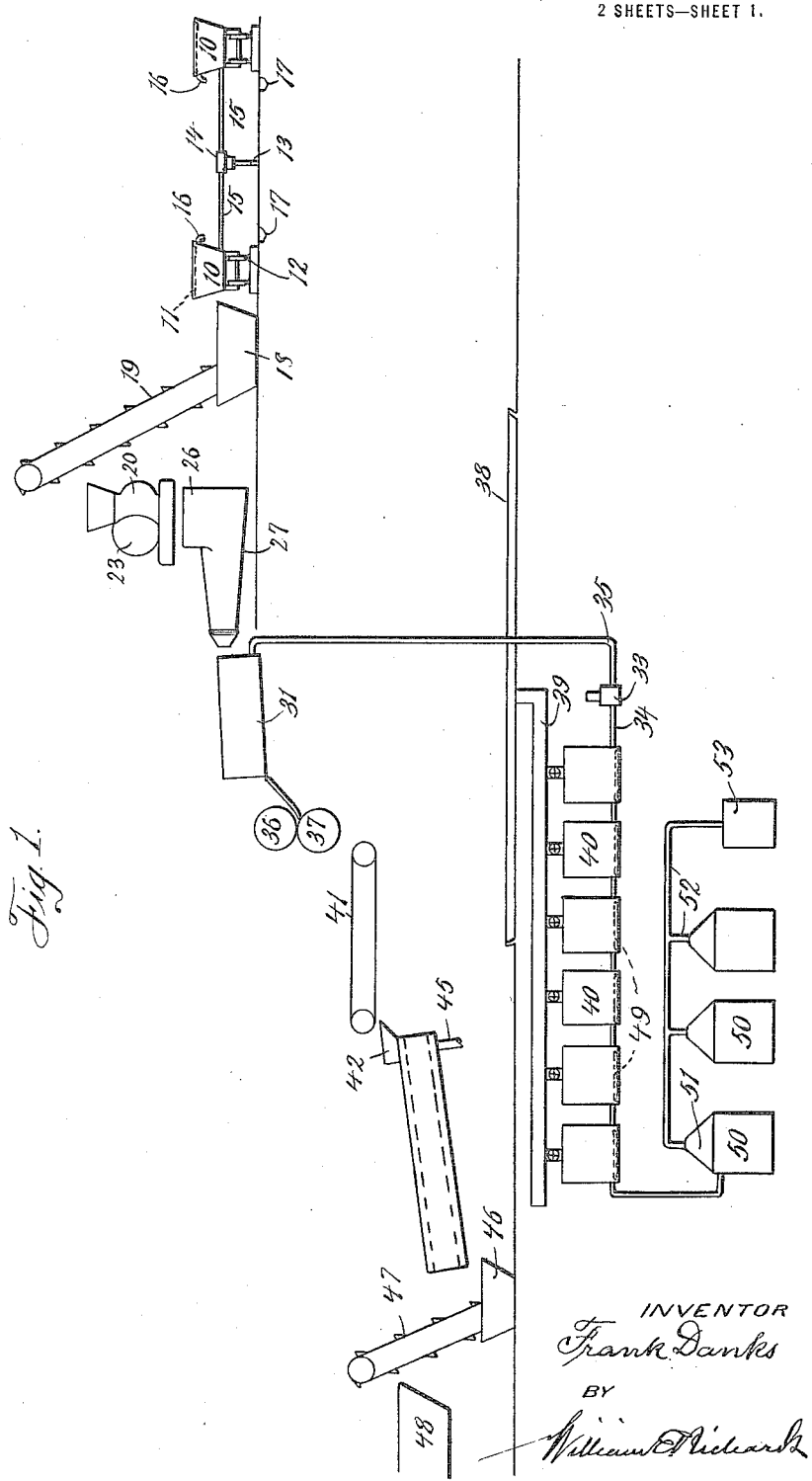

F. DANKS.
PROCESS OF TREATING GARBAGE AND PRODUCTION OF CARBONIC ACID GAS THEREFROM.
APPLICATION FILED APR. 1, 1918.
1,319,515.
Patented Oct. 21, 1919.
2 SHEETS—SHEET 2.
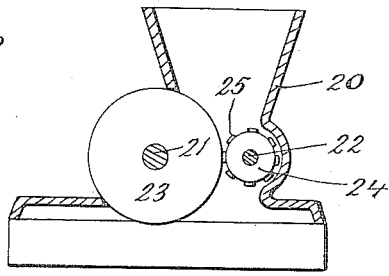
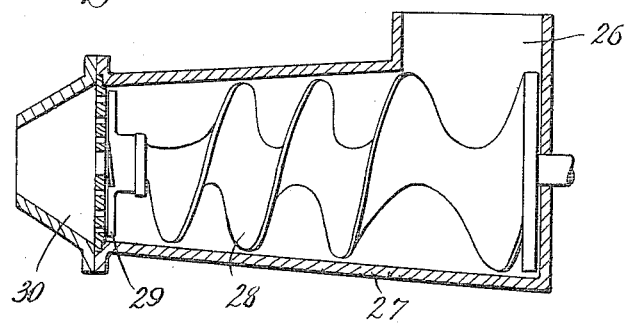
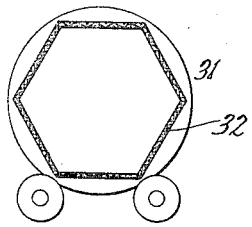
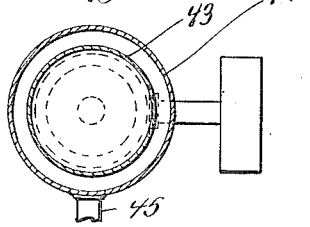
INVENTOR
Frank Danks,
BY
William E. Richards
ATTORNEY

UNITED STATES PATENT OFFICE.

FRANK DANKS, OF TROY, NEW YORK.

PROCESS OF TREATING GARBAGE AND PRODUCTION OF CARBONIC-ACID GAS THEREFROM.

1,319,515. Specification of Letters Patent. Patented Oct. 21, 1919.

Application filed April 1, 1918. Serial No. 226,049.

*To all whom it may concern:*

Be it known that I, FRANK DANKS, a citizen of the United States, residing at Troy, county of Rensselaer, and State of New York, have invented certain new and useful Improvements in Processes of Treating Garbage and Production of Carbonic-Acid Gas Therefrom, of which the following is a specification.

This invention relates to the treatment of garbage and other organic matter, and has for its object to obtain carbonic acid gas therefrom, and at the same time to utilize a considerable portion of said material for the production of other valuable products such as cattle-food, ammonia, or fertilizers.

It is well known that garbage and other organic matter, particularly the type known as kitchen garbage, which consists principally of scraps of meats, bones, vegetables, and other kitchen refuse, is rich in nitrogenous, carbo-hydrate and proteid contents, which only require proper treatment to yield valuable products, and the object of this invention is to provide processes and methods of treatment that will secure such results.

In the drawings I have illustrated types of apparatus that may be used in carrying out the various steps of my process, and in which:—

Figure 1 is a side elevational view showing diagrammatically the apparatus employed;

Fig. 2 is an enlarged transverse sectional view of the disintegrator;

Fig. 3 is an enlarged longitudinal sectional view of a granulator; and,

Figs. 4 and 5 are enlarged transverse sectional views of the screen and drier respectively.

In carrying out my present invention I first degrease the garbage.

In a co-pending application herewith, Serial Number 224,363, filed March 23, 1918, I have shown and described a preferred form of degreaser, which extracts the grease from the garbage in a predetermined manner, the apparatus comprising wheeled containers 10, with removable covers 11, mounted upon a circular track 12.

The garbage as received is dumped into said containers, steam being admitted thereto from a suitable source of supply through a central pipe 13, having a revoluble head 14 from which supply pipes 15 connect with inlet pipes entering the containers at or near the bottom thereof. A steam gage and valves provide means for regulating the temperature in the containers.

As the steam enters the containers it is condensed, and the water of condensation as it rises in the containers saturates the garbage and melts the grease which, rising with the water, finally passes through outlet pipes 16, at or near the tops of the containers, into a circular gutter 17 which is disposed adjacent to the track, and is collected therein for use.

The degreased garbage is then dumped into a receiving vat 18, from which it is delivered by a suitable conveyer 19 in successive portions into a disintegrator. As shown in Fig. 2, the disintegrator comprises a frame 20, in which are journaled driving shafts 21, 22, driven by any usual form of mechanism.

A large crushing roller 23 is driven by the shaft 21 at a preferred speed of approximately 150 revolutions per minute, while adjacent to its periphery a smaller disintegrating roller 24, provided with peripheral ribs or teeth 25, is driven by the shaft 22 at a speed of approximately 500 or 600 revolutions per minute.

The garbage passing through the disintegrator is thoroughly crushed, torn and disintegrated, and then passes into the open mouth 26 of a granulator, which comprises a tubular body 27, containing a spiral helix 28, which operates in the well known manner of a food chopper, cutting, crushing and comminuting the garbage, and finally forcing it out through cutters 29 in the nozzle 30, into a rotating screen 31, having perforated sides 32 in a finely divided and commingled state.

The garbage is washed in the screen 31 with an acidulated liquid conveyed from the hydrolytic vats, hereinafter more fully described, by a pump 33 and pipes 34, 35, to dissolve and wash out the carbo-hydrate contents thereof, the more solid portions then being passed between compression rollers 36, 37, to extract any liquid content remaining therein.

The liquid portion containing the carbohydrates falls from the screen 31 and compression rollers 36, 37, into a receiving trough 38, from which it is delivered by a conduit 39 to the hydrolytic vats 40, while the solid portions of the garbage pass from said rollers onto a conveyer 41, which delivers them into the open hopper 42 of a drier, which comprises an inner revolving container 43, with an outer jacket 44, steam being admitted between the container and jacket from a suitable source of supply through an inlet pipe 45, the container being rotated by any usual or suitable mechanism therefor.

The more solid portions of the garbage are dehydrated in said drier, and pass therefrom into a receiving vat 46, and are conveyed therefrom by a conveyer 47 to suitable storage receptacles 48. The dehydrated, finely comminuted portion of the garbage thus treated forms a well balanced, nutritious cattle food, having a large proteid content.

The liquid portion of the material in the hydrolytic vats 40, which are provided with steam heating coils 49, are treated for the recovery of carbonic acid gas by adding thereto a dilute mineral acid, the acid strength of which is approximately one per cent., and then boiling therein by steam heat for five or six hours, at a temperature of approximately 212 degrees Fahrenheit, or until the carbo-hydrates contained therein are converted into sugar, I then neutralize the acid by the addition of an alkaline material, such, for example, as chalk.

After such neutralization I draw off the sugary liquid, either with or without filtration of the same and deliver the same to fermentation vats 50, provided with gas collectors, which I have shown as hoods 51.

I then add a suitable ferment, such as diastase or yeast, in substantially the proportion of one part of ferment or yeast to five parts of sugary liquid, and carry on the fermentation of the liquid for approximately 36 hours at a temperature of 60 to 80 degrees Fahrenheit, the carbonic acid gas evolved during the fermentation rising into the hoods 51 from which it is conducted by pipes 52 to a condenser 53, where it is condensed, and from which it is drawn into suitable containers for commercial purposes.

I do not herein make specific claim to any of the apparatus shown in connection with the carrying out of the several steps of my process, as any of the usual and well-known devices suitable for the purpose may be employed.

Instead of treating the solid portions of the garbage for the production of cattle food, as herein described, they may be used for the production of a fertilizer, as described in my application co-pending herewith, Serial Number 225,587, filed March 29, 1918, or for the production of ammonia, as described in my co-pending application, Serial Number 225,586, filed March 29, 1918, I have also claimed the cattle food as produced by this process in my co-pending application, Serial Number 224,366, filed March 23, 1918.

Having described my invention, what I claim as new and desire to secure by Letters Patent is:—

1. The process of treating garbage and other organic material to produce carbonic acid gas therefrom consisting in first removing the grease therefrom by the application of steam, next subjecting it to a crushing and tearing action, then to a cutting action to reduce it to a finely divided state, then washing out the carbo-hydrates contained therein and separating the solids therefrom, subjecting the liquid carbo-hydrates separately to the action of heat in the presence of a dilute mineral acid, then neutralizing the acid, and finally fermenting the resulting product, and collecting and removing the gas evolved thereby.

2. The process of treating garbage and other organic material consisting in first degreasing, disintegrating and comminuting it, washing and pressing out carbo-hydrates contained therein in liquid form, and removing the solids therefrom, boiling the liquid carbo-hydrates separately with a dilute mineral acid until converted into a sugary liquid, then neutralizing the acid, and finally fermenting the liquid, and collecting and removing the carbonic acid gas evolved thereby.

3. The process of treating garbage and other organic material to produce carbonic acid gas therefrom consisting in first separating the grease therefrom by the application of steam, next subjecting it to a crushing and tearing action, then to a cutting action to reduce it to a finely divided state, adding liquid thereto and removing carbohydrates contained therein in liquid form, adding a dilute mineral acid to the liquid carbo-hydrates and boiling the latter until converted into a sugary liquid, neutralizing the acid, fermenting the sugary liquid, and condensing and collecting the carbonic acid gas evolved during the process of fermentation.

4. The process of treating garbage and other organic material consisting in washing said material with an acidulated liquid and dissolving and pressing out carbo-hydrates contained therein, adding a dilute mineral acid to said carbo-hydrates and heating the same until a sugary liquid is formed, neutralizing the acid, fermenting the sugary liquid, and collecting and condensing the carbonic acid gas evolved during fermentation.

5. The process of treating garbage and other organic matter, consisting in degreasing and reducing the same to a disintegrated and comminuted condition, adding a dilute mineral acid and dissolving the carbohydrates therein, separating the solid materials from the liquid carbo-hydrates, subjecting the latter to hydrolytic action to effect conversion into a sugary liquid, fermenting the latter in vats provided with gas collectors, and collecting the carbonic acid gas given off during fermentation.

In testimony whereof, I have signed my name to this specification this 16th day of February 1918.

FRANK DANKS.